June 20, 1967 E. J. SMITH ETAL Re. 26,223

BASE MATERIALS COATED WITH AN ALLOY OF ALUMINUM AND MANGANESE

Original Filed June 9, 1960 3 Sheets-Sheet 1

INVENTORS
EDWIN J. SMITH
MICHAEL G. VUCICH
BY LOWELL W. AUSTIN

Shanley & O'Neil
ATTORNEYS

EFFECT OF MANGANESE CONCENTRATION AND CURRENT DENSITY ON BRIGHTNESS

INVENTORS
EDWIN J. SMITH
MICHAEL G. VUCICH
LOWELL W. AUSTIN
BY Stanley & O'Neil
ATTORNEYS INVENTORS
EDWIN J. SMITH
MICHAEL G. VUCICH
LOWELL W. AUSTIN
BY Shanley & O'Neil
ATTORNEYS United States Patent Office Re. 26,223
Reissued June 20, 1967

26,223

BASE MATERIALS COATED WITH AN ALLOY OF ALUMINUM AND MANGANESE

Edwin J. Smith, Steubenville, Ohio, and Michael G. Vucich and Lowell W. Austin, Weirton, W. Va., assignors to National Steel Corporation, a corporation of Delaware Original No. 3,167,403, dated Jan. 26, 1965, Ser. No. 34,923, June 9, 1960. Application for reissue Oct. 28, 1965, Ser. No. 506,903

8 Claims. (Cl. 29—196.2)

Matter enclosed in heavy brackets [ ] appears in the original patent but forms no part of this reissue specification; matter printed in italics indicates the additions made by reissue.

This invention broadly relates to the coating of base materials with an alloy of aluminum and manganese and the resultant coated products. In some of its more specific aspects, the invention relates to the electrodeposition of alloys and, more particularly, to the electrodeposition of an alloy of aluminum and manganese. The invention further relates to a novel method of producing bright aluminum electroplate in the as plated condition, a novel electrolyte bath, and the products produced in accordance with the invention.

This application is a continuation-in-part of our copending application Serial No. 819,298, filed June 10, 1959, now abandoned.

One embodiment of the present invention will be described and illustrated hereinafter with specific reference to electroplating an aluminum-manganese alloy on ferrous metal strip using a fused electrolyte containing a major proportion of aluminum chloride and the remainder one or more alkali metal chlorides such as sodium or potassium chloride. However, it will be apparent to those skilled in the art that the principles of the invention are applicable to other metal bases, forms of metal bases, and fused salt electrolytes in general for electroplating aluminum. Also, that other methods may be employed for coating metallic or other suitable base materials with an aluminum-manganese alloy to provide the resultant coated products.

A fuming fused electrolyte bath composition having an aluminum chloride content of approximately 75–85% by weight with the remainder being sodium and/or potassium chloride is useful in producing good aluminum electroplate. The electrolyte composition may be of binary or ternary type, with a satisfactory binary electrolyte composition being exemplified by a composition containing by weight 80% aluminum chloride and 20% sodium chloride and a satisfactory ternary electrolyte being exemplified by a composition containing by weight 80% aluminum chloride, 10% sodium chloride and 10% potassium chloride. Although a fused electrolyte bath containing 80–85% aluminum chloride produces objectionable visible fuming in the presence of water, an electrolyte containing more than 85% aluminum chloride fumes excessively and the plating results usually are not improved by increasing the aluminum chloride content above this value. If the aluminum chloride content falls below about 75% by weight, poor plating results when using unmodified direct current and in the absence of special plating conditions. Thus, such electrolyte compositions usually are not preferred. However, it is possible to use electrolyte compositions containing less than 75% aluminum chloride and the remainder alkali metal chloride when using special plating conditions and/or by using low current densities. For example, non-fuming baths maintained in the molten state at a temperature of about 190–200° C. and containing less than 70% aluminum chloride, e.g., substantially no free aluminum chloride, may be used to electroplate satisfactory adherent, non-powdery aluminum deposits when using straight direct current at current densities less than one ampere per square foot, at current densities less than one ampere per square foot when using polarity reverse current, at current densities up to two amperes per square foot when using pulse direct current, and up to fifteen amperes per square foot when using a hot cathode maintained at a temperature much higher than the bath temperature. At higher bath temperatures within the operative range, current densities may be raised to some extent without resulting in the deposition of powdery deposits or deposits having other imperfections. With slightly fuming aluminum chloride-alkali metal chloride baths, i.e., electrolyte baths containing about 70% aluminum chloride and the remainder alkali metal chloride and having a free aluminum chloride content of about 0.5–1.5%, the current density may be up to five amperes per square foot when straight direct current is used, up to ten amperes per square foot when polarity reverse current is used, above fifteen amperes per square foot when using a hot cathode maintained at temperatures much higher than the bath, and considerably above 18.6 amperes per square foot when using pulse direct current. When using a fuming aluminum chloride-alkali metal chloride bath, such as a bath containing 80% aluminum chloride, 10% sodium chloride and 10% potassium chloride, current densities up to 100 amperes per square foot and often as high as 100–400 amperes per square foot may be used with straight direct current, with the current densities for special plating conditions being equally satisfactory or even better. Thus, it is apparent that a wide variety of aluminum chloride-alkali metal chloride electrolyte baths are suitable for the electrodeposition of aluminum on a metal base such as ferrous metal and that any suitable one of these baths may be used in practicing the present invention. In general, the electrolyte baths for use in practicing the present invention are prior art aluminum electroplating baths containing the novel additive to be discussed hereinafter.

Still other aluminum electroplating baths are known to the art and may be used in practicing the present invention. For example, one or more of the chloride salts of the baths mentioned herein may be replaced with other suitable halide salts such as aluminum bromide, sodium bromide and potassium bromide in the molar proportions existing in the above mentioned baths. Also, the aluminum chloride may be complexed with other complexing agents such as ammonia, organic amines, or their salts in a manner somewhat similar in effect to the complexing of aluminum chloride in the foregoing baths with potassium and/or sodium chloride. An aluminum chloride-ammonia bath contains complexed aluminum chloride which is thought to be in the form of $AlCl_3.NH_3$ or possibly higher members of the ammonia series with varying amounts of free aluminum chloride being dissolved therein in the case of the fuming bath, or a non-fuming bath may be used as discussed above for the more common aluminum chloride-alkali metal chloride baths. Further, aluminum chloride may be complexed by means of organic amines and their salts such as ethyl pyridinium bromide to produce the complex ethyl pyridinium bromide-$AlCl_3$. This material may likewise have free aluminum chloride dissolved therein or it may be a non-fuming bath as discussed above.

The various fused salt aluminum electroplating baths discussed above may be considered to be, broadly speaking, electrolyte baths containing aluminum halide and a complexing agent therefor with the aluminum halide complex being in the molten state and having dissolved therein free aluminum halide in instances where it is present. Such fused salt electrolyte bath compositions known to the art to be suitable for the electroplating of aluminum and capable of dissolving the additive to be discussed hereinafter are operative in practicing the present invention.

It is understood that when substituting other halides for chlorides in the electroplating baths discussed herein, the substitutions will be made in molar proportions rather than in proportions by weight so as to provide the same molar proportion of aluminum halide, the complexing agent therefor and the free aluminum halide dissolved therein. Unless specifically stated to the contrary, the parts and percentages of the specific electrolyte bath ingredients mentioned herein are in parts or percentages by weight. If desired, substitution of other materials may be made on a molar basis.

Organic-type baths for electroplating aluminum also are known. Such baths may contain an organic compound such as an organic solvent or organo-metallic compounds. The composition, preparation and use of organic-type baths for the electrodeposition of aluminum are described in numerous publications and patents including United States Patents 1,911,122, 1,939,397, 2,170,375, 2,446,349, 2,651,608, 2,763,605, 2,849,349, 2,902,416.

When electroplating bright aluminum deposits in the form of an aluminum-manganese alloy in accordance with the teachings of the present invention, the above electroplating baths may be used under the same conditions as when electrodepositing aluminum matte. In fact, no substantial change in operating conditions is necessary, generally speaking, other than in providing the proper additive concentration in the electrolyte bath. An example of a highly satisfactory method and apparatus for electroplating aluminum from aluminum halide-alkali metal chloride baths is disclosed in copending application Serial No. 665,743, filed June 14, 1957, by Edwin J. Smith and Michael G. Vucich for Plating Apparatus and Method, the teachings of this application being incorporated herein by reference. However, other suitable apparatus and methods are known to the art and may be used.

When using the above-described electrolyte baths under the most favorable conditions, the resulting aluminum electrolyte in the as plated condition is in the form of matte. Since bright, lustrous plate is necessary for most commercial applications and matte aluminum electroplate of the prior art is unsatisfactory, many attempts have been made to convert the usual white matte electroplated surface to a bright, reflective surface resembling tinplate. The only practical method available heretofore for brightening white matte deposits of aluminum has been by passing the matte through smooth highly polished rolls to which pressure is applied. The degree of brightness obtained by this method depends upon several factors such as smoothness of the rolls, pressure exerted by the rolls, rolling speed and the quality of the original aluminum matte electrodeposit. This method invariably results in numerous operating difficulties since the brightening lines must be stopped frequently in order to remove the build-up of aluminum on the rolls or to regrind the rolls. It is impractical to reflow aluminum matte in the manner of tinplate where thin coatings are applied due to rapid annoying of aluminum with steel at the elevated temperatures required to melt the aluminum. Also, attempts to reflow aluminum electroplate where thin coatings are applied have resulted in coatings with a dark, dull appearance. This is believed to be due to the fact that aluminum and ferrous metal alloy too rapidly leave a bright reflowed layer of aluminum. In view of the foregoing, it may be seen that the two usual methods of brightening matte electroplate have proved to be entirely unacceptable in the brightening of aluminum matte where light coatings of aluminum such as 100-millionths of an inch or less are applied. Accordingly, the art has long sought a satisfactory method which would overcome the above-mentioned difficulties and which could preferably be incorporated with a continuous aluminum electroplating line.

In accordance with one embodiment of the invention, it has been discovered that coatings of an alloy of aluminum and manganese may be deposited on base materials to provide novel coated products by a number of methods. It has been further discovered that such alloy coatings have properties which render them remarkably effective as protective coatings for corrodible base materials, and thus the products of the invention are characterized by excellent corrosion resistance.

In accordance with one important embodiment of the present invention, it has been discovered that aluminum may be electroplated in the form of a coating which is bright, lustrous and reflective by adding manganese to a prior art electrolyte bath for electroplating aluminum. The resulting electroplate is bright, lustrous and reflective and resembles tinplate somewhat in this respect. Further brightening is not necessary and it is ready as plated for use in the manner of tinplate.

It is an object of the present invention to provide novel methods of coating base materials with an alloy of aluminum and manganese.

It is a further object of the present invention to prepare novel coated products wherein a base material is provided with a coating of an alloy of aluminum and manganese.

It is a further object of the present invention to provide a novel method of the electrodeposition of aluminum-manganese alloys.

It is a further object of the present invention to provide a novel method of producing aluminum electroplate which is bright in the as plated condition.

It is still a further object of the present invention to provide a novel method of electroplating bright aluminum-manganese alloy coatings on a metal base using an electrolyte for electroplating aluminum containing manganese as an additive.

It is still a further object of th present invention to provide an electroplated alloy of aluminum and manganese containing at least about 10% manganese and the remainder aluminum together with incidental impurities.

It is still a further object of the present invention to provide novel electrolyte baths suitable for use in practicing the present invention.

Still other objects of the present invention and the advantages thereof will be apparent to those skilled in the art upon reference to the following detailed description and the drawings, wherein.

Figure 3:
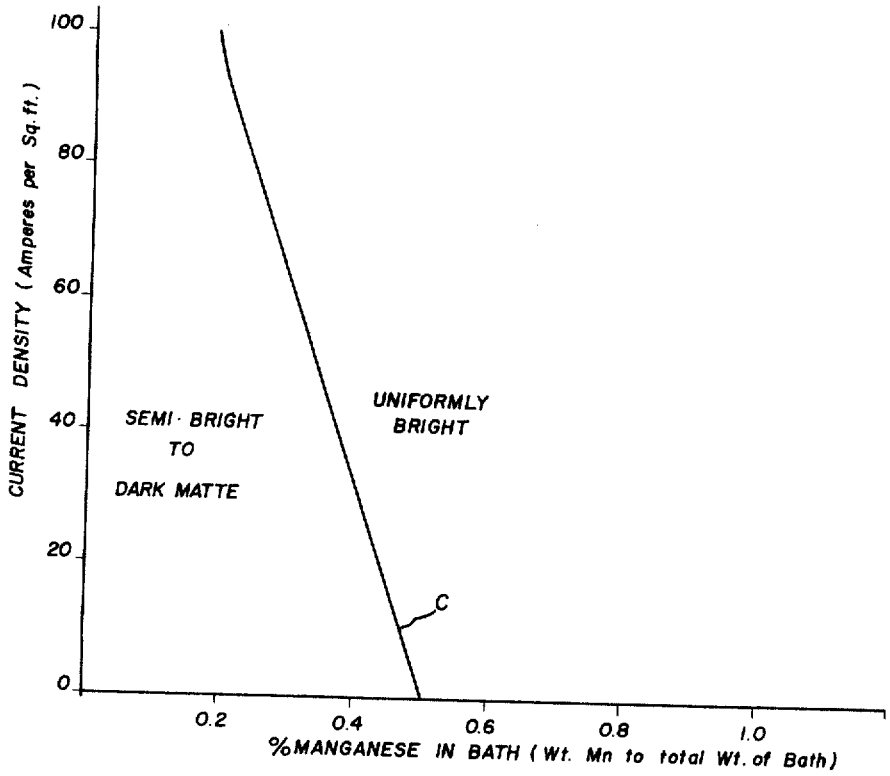
Figure 4:
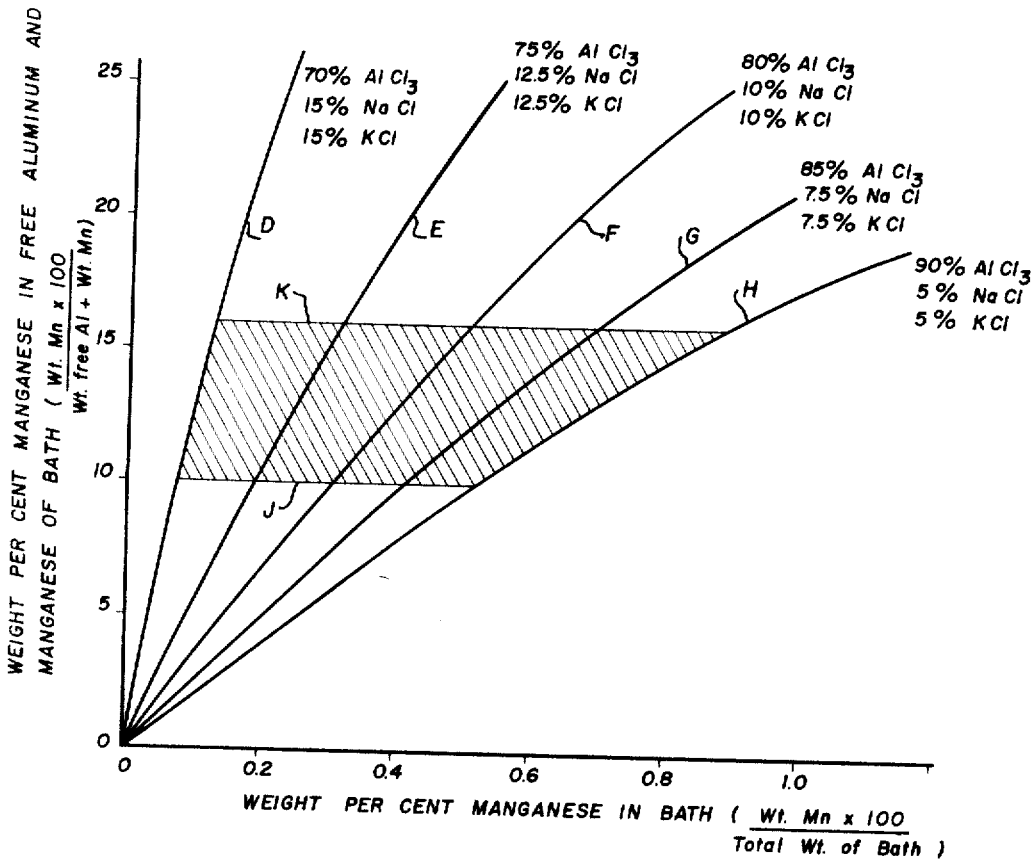

FIGURE 3 graphically illustrates the effect of manganese concentration and current density on brightness of the aluminum-manganese alloy coating when using an electrolyte bath containing by weight 80 parts aluminum chloride, 10 parts sodium chloride and 10 parts potassium chloride; and FIGURE 4 graphically illustrates the relationship between the weight percent of manganese in the bath and the weight percent of manganese based on the total weight of free aluminum and manganese in the bath when producing bright aluminum-manganese electroplate.

Figure 1:
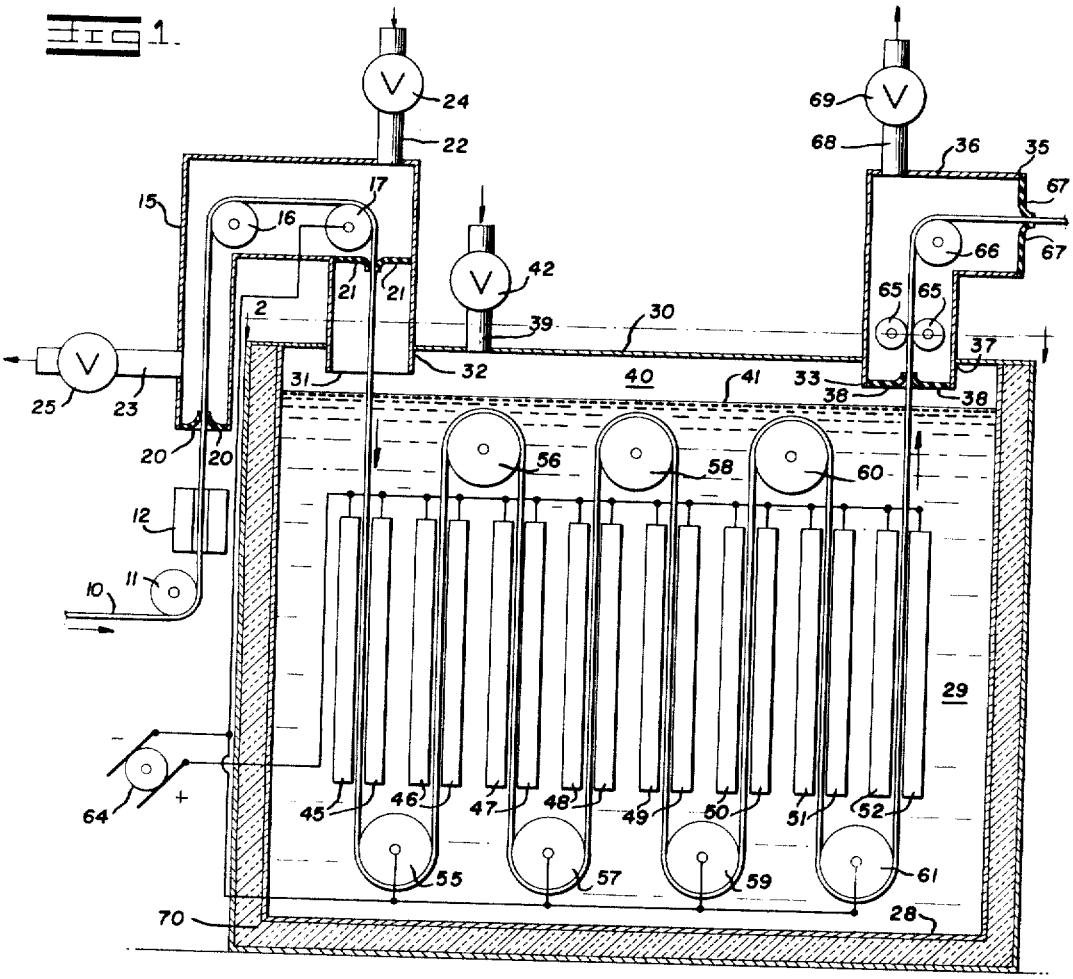
FIGURE 1 is a diagrammatic side elevational view, partially in cross section, of apparatus for use in practicing the present invention.
Figure 2:
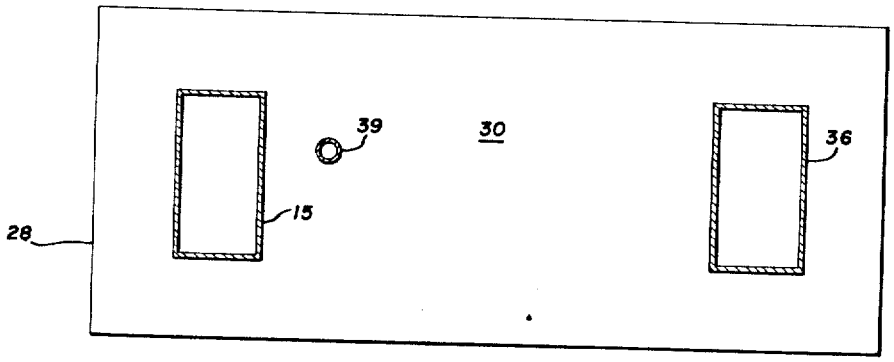
FIGURE 2 is a cross-sectional view taken along the line 2—2 of FIGURE 1 but omitting a showing of the strip, the sealing flaps, the rolls, and the electrodes for the purpose of clarity.

Referring now to FIGURES 1 and 2 of the drawings, which illustrate a specific embodiment of the invention, the ferrous metal strip 10 after receiving a wet prior art treatment or other suitable pretreatment such as cathodic cleaning in an Orthosil solution ($Na_4SiO_4$) employing a treating time of 1–2 seconds at a current density of 35 ampere seconds per square foot, followed by, in sequence, brushing and spraying with water, anodic pickling in a suitable electrolyte such as aqueous 35% sulfuric acid for 2–3 seconds at 80–100 amperes per square foot, scrubbing and washing with water and drying to remove all traces of water, is shown passing under roll 11. The strip 10 then passes upwardly through heater 12 where it is heated sufficiently to completely evaporate any free water remaining on the strip surface. The heated ferrous metal strip 10 passes upwardly through strip conditioning unit 15 where it is thoroughly dried to remove any remaining traces of free water and then passes over rolls 16 and 17. If desired, the ferrous metal strip 10 may be treated within strip conditioning unit 15 in a reducing atmosphere or otherwise treated for the purpose of further conditioning the strip surface and assuring absolute removal of free water, combined water and substances forming water under the conditions present in the electroplating unit. It also may be desirable to preheat the strip to a temperature about the temperature of the bath at the time plating is commenced. Two parts of suitable sealing flaps 20 and 21 are provided near the entrance and exit ends, respectively, of strip conditioning unit 15 to prevent undue loss of any dry gaseous treating agent which may be employed in strip conditioning unit 15, as well as in aiding in preventing entry of atmospheric water vapor. The dry gaseous treating agent may be supplied to strip conditioning unit 15 by means of conduit 22 and withdrawn by means of conduit 23. The flow rate of dry gaseous treating agent to strip conditioning unit 15 via conduit 22 is controlled by means of valve 24, while the withdrawal rate via conduit 23 is controlled by means of valve 25. Any suitable dry gaseous treating agent may be employed in strip conditioning unit 15 depending upon the nature of the treatment desired. However, it is essential that the treatment be such so as to insure that the surface of ferrous metal strip 10 is free of free water, combined water such as hydrated ferrous metal salts, or substances reacting under conditions present in the electroplating zone to form water upon exit from strip conditioning unit 15. In addition, it is essential once the strip has been thoroughly dried and freed of all sources of water that the dry strip not be subjected to any source of water while passing from the drying step to the electrolyte. It is preferred to surround the strip at all times with a dry medium, such as a dry, non-reactive gas, during passage from the drying step to the electroplating bath. In instances where special conditioning treatment is not necessary, the gaseous treating agent may be dry air, nitrogen, carbon dioxide, argon, etc. Usually, it is preferred that the gaseous treating agent be supplied through strip conditioning unit 15 at about atmospheric pressure.

The ferrous metal strip 10 passes downwardly from strip conditioning unit 15 into electroplating tank 28 containing an aluminum electroplating electrolyte such as herein described. The electrolyte 29 may be a fused electrolyte containing a predominant proportion of aluminum chloride such as for example 80% aluminum chloride, 10% sodium chloride and 10% potassium chloride on a weight basis and when such an electrolyte is used it fumes in the presence of water or water vapor under the operating conditions. A hood 30 is positioned above electroplating tank 28, as best seen in FIGURE 2. The exit end 31 of strip conditioning unit 15 extends downward a short distance through opening 32 in hood 30 and, similarly, the entrance end 33 of unit 36 extends downward a short distance through opening 37 in hood 30, thereby providing an entrance and an exit, respectively, to electroplating tank 28 for ferrous metal strip 10. The hood 30 is joined to both strip conditioning unit 15 and unit 36 in air-tight relationship, and since sealing flaps 21 and 38 are provided near ends 31 and 33, respectively, this combination of elements substantially seal off electrolyte 29 from the surrounding atmosphere. A gas or gaseous mixture such as dry nitrogen, carbon dioxide, argon or air is fed by means of conduit 39 into space 40 within electroplating tank 28 and above level 41 of electrolyte 29 and the undersurface of hood 30. A valve 42 is provided in conduit 39 for the purpose of controlling the feed rate of dry gas that is fed to space 40.

Electroplating tank 28 is provided with spaced pairs of aluminum-manganese alloy anodes 45 and 46–52. The foregoing anodes may be of high purity aluminum when an auxiliary source of manganese is provided, such as when manganese is added to the bath in the form of a manganese halide such as manganese chloride or other suitable manganese mineral acid salts soluble in the electrolyte bath 29, or manganese may be added to the bath by dissolution of auxiliary anodes containing manganese in an auxiliary electrical circuit. The provision of auxiliary anodes and addition of a desired metal to an electroplating bath by means of their dissolution in an auxiliary circuit is well known to the art and, although not illustrated in the drawings in the interest of clarity, it is understood that such a method of adding manganese is within the scope of the present invention.

The ferrous metal strip 10 passes downwardly from roll 17 into fused electrolyte 29 and is subsequently passed between the spaced pairs of anodes by means of a path established by rolls 55 and 56–61. The spaced pairs of anodes are electrically connected to the positive side of generator 64 (or other suitable source of current), while ferrous metal strip 10 is made electro-negative between contact rolls 17, 55, 57, 59 and 61 and the corresponding pairs of electrodes operably arranged with respect to each of the rolls by means comprising an electrical connection between the rolls and the negative side of generator 64. The ferrous metal strip 10 is electroplated with a coating of aluminum-manganese alloy containing at least about 10% manganese and the remainder aluminum. The coating may be of any suitable desired thickness and will be bright in the as plated condition regardless of the thickness since the thickness of the electroplate appears to have little or no effect on its brightness. However, as is true of other electroplating processes producing bright electroplate in the as plated condition, it is advantageous to provide a smooth surface on the strip 10 and it should not be subjected to a strong pickling action. The brightest plate is produced on smooth steel given a short pickle at low current densities. Overetching of the surface results in a somewhat duller finish although the electroplate still is bright as plated.

When the electrolyte contains by weight 80% aluminum chloride, 10% sodium chloride and 10% potassium chloride the bath 29 may be at a temperature of about 250–400° F. and, preferably, about 300–350° F. Current density, preferably, should be from 20 to about 100 amperes per square foot. However, under optimum conditions of operation, current densities up to about 100 to 400 amperes per square foot are possible and may be used when desired. As previously mentioned, the electroplating conditions for use in accordance with the present invention need not differ in any respect from those of the prior art for electroplating substantially pure matte aluminum deposits other than in providing the proper manganese concentration in the electrolyte bath. It is understood that plating conditions will necessarily vary somewhat from electrolyte to electrolyte. However, suitable conditions for a given prior art electrolyte for the electroplating of aluminum are well known to those skilled in the art and may be selected as if aluminum alone were to be electroplated.

After passing under roll 61, the ferrous metal strip 10 passes upwardly through electrolyte 29 and after emerging therefrom passes between squeegee rolls 65, which reduce the amount of dragout of electrolyte to some extent. The ferrous metal strip 10 continues to pass upwardly through unit 36 and is then passed horizontally over roll 66. A pair of sealing flaps 67 are provided at the exit end 35 of unit 36 for the purpose of sealing off the exit and thereby allowing a slight suction to be applied to unit 36 through exhaust conduit 68 when this may be desired, as well as preventing entry of atmospheric water vapor which would have a detrimental effect on the aluminum chloride content of the electrolyte. The exhaust conduit 58 is provided with valve 69 for the purpose of controlling exhaust of unit 36 in instances where it is exhausted. The plated ferrous metal strip 10, after passing over roll 66, passes from the exit end of unit 36 and then may be washed with water and dried or given other subsequent treatments. However, the washed and dried electroplate is generally very satisfacory for use directly in the manufacture of containers of the type for which tinplate is generally used. Since the aluminum-manganese alloy electroplate does not require flow brightening, roll brightening or other brightening steps, the customary brightening step following electro-deposition of pure aluminum coatings is completely eliminated. The electroplated strip emerging from unit 36 is bright, lustrous and reflective in the as plated condition.

For the purpose of minimizing loss of heat, electroplating tank 28 may be surrounded by an insulating material 70. Additionally, and in order to maintain the fused electrolyte 29 at the proper operating temperature, heating means (not shown) may be employed as is conventional in the art. For example, immersion heating may be employed in the conventional manner wherein the heating units are immersed directly in the electrolyte or, preferably, the insulating material 70 may be spaced from the electroplating tank 28 and the electroplating tank surrounded within the space thus formed by suitable heating means such as fin-type strip electrical heaters.

The gas or gaseous mixture fed through conduit 39 must be dry, but it may be at any suitable convenient temperature such as room temperature. The pressure employed within space 40 may be atmospheric pressure or slightly above although any suitable convenient pressure may be applied. It is only necessary to replace the atmosphere within space 40 with a dry gas and a slight suction may be maintained, if desired, on strip conditioning unit 15 and unit 36 by means of exhaust conduits 23 and 68, respectively, to aid in the escape of gas fed to space 40 together with any moisture or water content through flexible sealing flaps 21 and 38. It is not necessary that the gas be supplied under pressure or the atmosphere within space 40 maintained under a substantially elevated pressure. However, a pressure above atmospheric pressure may be preferred in some instances for best results. The composition of the specific dry gas or dry gaseous mixture supplied to space 40 may vary widely. It is only necessary that the dry gas or gaseous mixture be substantially non-reactive under the conditions of operation of the electroplating line with the electrolyte 29, the strip 10 or the apparatus contacted by the gas or gaseous mixture.

It is surprising that aluminum and manganese readily codeposit in the form of an aluminum-manganese alloy which is bright in the as plated condition. This is especially true since it has been found that other heavy metals such as iron, copper, lead, nickel, etc., tend to adversely affect the color of the coating. For example, amounts of iron in the bath in percentages as low as 0.02% will produce black or unsatisfactory discolored coatings, while small amounts of lead will produce milky to gray coatings. Also, these metals all will tend to precipitate from the electrolyte upon standing in the presence of aluminum or aluminum anodes while it has been discovered that manganese does not.

Manganese should be added to the electrolyte bath in an amount to provide the desired percentage of manganese in the resultant aluminum-manganese alloy coating. Generally speaking, when the alloy coating contains at least 10% manganese and, preferably, 10–70% manganese and the remainder aluminum with incidental impurities, then the electroplate is bright as plated. However, amounts such as 16–30% manganese and 84–70% aluminum together with incidental impurities generally give more uniform and brighter deposits. About 16–20% manganese and about 84–80% aluminum are preferred in most instances as manganese contents greater than about 20% do not seem to further improve corrosion resistance. When the alloy contains 10–16% manganese, then it should be deposited at high current densities and with agitation in order to assure the best results. Under the proper conditions, very good results are obtained when electroplating a coating containing about 10, 11 or 12% manganese and the remainder aluminum togther with incidental impurities. Amounts of manganese larger than 30% such as about 40%, 50%, 60% and 70% manganese may be present but do not result in improved appearance or corrosion resistance in most instances. The manganese is preferably added to the electrolyte continuously by means of special aluminum-manganese anodes having a composition substantially the same as that desired in the alloy coating. In such event, the manganese upon dissolution may be thought of as being present in the bath in the form of a salt of an anion present in the bath such as manganese chloride when using chloride salts of aluminum and alkali metals in the bath. However, the manganese may be directly added in the form of anhydrous manganese salts such as anhydrous manganese chloride, and this method of addition is especially desirable when commencing operations and preparing the fused body of electrolyte preliminary to plating. Also, auxiliary anodes of manganese may be used and may be electrically connected in the usual manner for dissolution of an auxiliary anode, as is well known in the art. When organic-type baths are used, then a suitable manganese compound such as an organo-manganese compound may be added to provide the desired manganese content. Regardless of the method of addition of manganese, and whether or not the manganese bearing material added to the bath is a salt of manganese, such as manganese chloride or other manganese salts of a mineral acid, pure manganese or manganese alloy anodes, or other suitable source of manganese containing materials and substances, the markedly improved appearance of the aluminum coating will be effected provided the proper manganese concentration of the electrolyte bath is reached.

The amount of manganese to be added to the bath will vary somewhat from electrolyte to electrolyte. Broadly speaking, however, manganese in the form of a simple manganese salt may be present in the electrolyte in an amount providing about 10–70% by weight, and preferably, 16–30% by weight of manganese when based upon the total weight of manganese in the dissolved free manganese salt and aluminum in the free aluminum chloride. Thus, when a major proportion of the aluminum chloride is complexed as $NaAlCl_4$ or $KAlCl_4$, as in the case of a bath containing 80% by weight aluminum chloride, 10% sodium chloride and 10% potassium chloride, small additions of manganese are effective. For example, a manganese concentration as little as 0.2% by weight will produce bright plate provided the current density is high and there is proper agitation, with uniformly bright plate being obtained at all current densities when the bath contains at least 0.5% manganese. Larger additions of manganese may be made to obtain a desired higher manganese content in the electroplated alloy, but percentages greater than about 1% are usually not necessary or desired although amounts up to 2, 3, 4 or 5% or higher percentages may be used in some instances. Preferably, the above bath should contain about 0.5–1% manganese. Organic-type baths may contain concentrations of manganese providing about 10–70% and, preferably, 16–30% of manganese in the resultant coating.

Upon reference to FIGURE 3 of the drawings, which illustrates the effect of manganese concentration and current density on brightness for still plating when using a bath containing 80 parts aluminum chloride, 10 parts sodium chloride and 10 parts potassium chloride, by weight, it may be noted that, if the bath contains at least 0.5% manganese, then the resultant aluminum-manganese alloy plate is bright at practical current densities as illustrated by the area to the right of curve C. At manganese concentrations of about 0.2–0.5%, whether or not a bright coating as plated is obtained depends upon the current density, with bright coatings being obtained at about 100 amperes per square foot when the manganese concentration is 0.25%, at about 60 amperes per square foot when the manganese concentration is 0.3%, and at about 25 amperes per square foot when the manganese concentration is 0.4%. At manganese concentrations less than 0.25%, semi-bright or dark matte coatings are obtained in the area to the left of curve C. The above mentioned bath contains 66.8% by weight of aluminum chloride complexed as $NaAlCl_4$ and $KAlCl_4$, thus leaving 13.2% by weight free aluminum chloride or 2.67% by weight "free" aluminum in the bath.

FIGURE 4 of the drawings graphically illustrates the relationship between the weight percent of manganese in the bath and the weight percent of manganese based on the total weight of free aluminum and manganese in the bath when producing bright aluminum-manganese alloy electroplate from electrolyte baths of varying compositions. The curves D, E, F, G and H are based on calculations for electrolyte bath compositions containing 70, 75, 80, 85 and 90 weight percent aluminum chloride, respectively, with the remainder of the compositions being equal parts by weight of sodium chloride and potassium chloride. When the weight percent of manganese based on the total weight of manganese and "free" aluminum, i.e., aluminum contained in the aluminum chloride content of the bath which is not complexed as $NaAlCl_4$ or $KAlCl_4$, rises to about 16% or higher, then uniformly bright electroplate is always produced. Thus, the area above line K represents an area in which uniformly bright electroplate is produced under all plating conditions. At weight percent manganese concentrations of at least 10% and up to 16%, i.e., in the area between lines J and K, uniformly bright electroplate is usually obtained only under preferred plating conditions. For example, the current density should be 20–100 amps./sq. ft. or higher and preferably with agitation. In the area below line J, i.e., at manganese concentrations below about 10%, uniformly bright plate is not usually obtainable although bright areas may be present.

It has been found that higher current densities within the operative current density range for a given electrolyte bath will produce smoother and brighter plate at low concentrations of manganese. Improved deposits, in some instances, also may be obtained by using special current or plating conditions such as pulsating current, polarity reverse current, a hot cathode maintained at a temperature substantially above that of the operating temperature of the bath, agitation, etc. also, higher operative current densities for the same bath may be possible when using such aids and, as pointed out above, this is advantageous since higher current densities produce brighter deposits at low concentrations of manganese. However, in most instances the simple addition of higher concentrations of manganese will overcome any difficulties with respect to off-color plate at low current densities although current densities of at least 20 amperes per square foot generally are preferred.

While aluminum-manganese alloy coatings of the invention may be produced by electrodeposition from the inorganic or organic electrolyte baths for electroplating aluminum modified by addition of manganese as described herein, still other methods may be employed. Examples of other methods include hot dipping, vacuum deposition, cathode sputtering, metal spraying, and decomposition or reduction of volatile compounds of aluminum and manganese. When using a method other than electroplating for forming the alloy coating, then it may contain about 1–70% manganese and, preferably, 1–30% manganese by weight and the remainder aluminum together with any incidental impurities. However, manganese contents above about 20% by weight do not usually result in further improvement in corrosion resistance.

When a hot dipping method is employed, a metal base such as ferrous metal strip is immersed in a molten bath of an alloy of aluminum and manganese and then withdrawn. The resultant coating of molten alloy on the metal base is then solidified. The composition of the molten bath is adjusted to provide an alloy coating on the metal base containing about 1–70% manganese, and preferably about 1–30% manganese and about 99–70% aluminum together with any incidental impurities. Hot dipping methods of applying aluminum to base metals are well known to the art, and such methods may be modified by providing a molten metal bath as discussed above rather than relatively pure molten aluminum. Examples of patents relating to the application of aluminum by hot dipping methods include U.S. Patents 2,751,311 and 2,918,388. The melting points of aluminum-manganese alloys are about 660° C. and higher for alloys containing 1% or more manganese by weight. For aluminum-manganese alloys containing 10%, 20%, and 30% by weight manganese, the melting points are about 790° C., 870° C., and 950° C., respectively. Usually, the temperature of the molten bath should be sufficiently above the melting point of the specific alloy used to provide a working range such as 50–100° C. For example, when an aluminum-manganese alloy containing 10% manganese is applied, the bath temperature may be about 850° C.

The aluminum-manganese alloy coatings of the present invention also may be deposited on various substrates such as metals, including ferrous metal, and organic substrates such as plastics and paper by vacuum deposition techniques. One method involves deposition of an interspray of aluminum and manganese vapor. The aluminum and manganese vapor may be formed by using separate vapor sources such as heated crucibles or film-type evaporators may be used. Alternatively, an alloy of appropriate composition may be heated in a single crucible and evaporated, or a film-type evaporator may be used. Regardless of the method of forming the interspray of aluminum and manganese vapor, the resultant mixture of vapor is deposited on the metal to produce an alloy coating containing 1–70% manganese and preferably 1–30% manganese and 99–70% aluminum together with incidental impurities. Alternatively, separate aluminum and manganese vapor sources may be used and thin alternate layers of aluminum and manganese deposited followed by appropriate diffusion treatment at elevated temperature for a period sufficient to effect appreciable diffusion with alloy formation. In practicing this method, either the aluminum or manganese may be deposited in the form of a thin layer first, followed by deposition of a thin layer of the other metal. A plurality of aluminum and manganese coatings may be deposited alternately, if desired. The vacuum deposition of metals is well known in the art and is disclosed in numerous patents such as U.S. Patents 2,903,547 to Paul Alexander and 2,930,879 issued to Scatchard.

Cathode sputtering may be used to deposit the aluminum-manganese alloy coatings of the invention following the general procedure disclosed in prior art publications and patents such as U.S. Patents 2,200,909 and 2,357,411. Such processes are modified to provide a cathode which is an alloy of aluminum and manganese wherein the aluminum and manganese disintegrated from the cathode and deposited on the substrate is in the form of a coating containing 1–70% manganese and preferably 1–30% manganese and 99–70% aluminum together with incidental impurities. In practicing the method, a base material is coated with an alloy of aluminum and manganese by providing an anode and an aluminum-manganese alloy cathode in spaced relationship and impressing a voltage across the cathode and anode to disintegrate particles of aluminum and manganese from the cathode. The base material is contacted with the particles of aluminum and manganese to deposit a coating of the alloy of aluminum and manganese thereon.

Still another method of applying the aluminum-manganese alloy coatings of the present invention is by spraying. The metal base to be coated is sprayed with a molten alloy of aluminum and manganese to form a molten alloy coating thereon and then the coating is solidified. The sprayed molten alloy has a composition providing an alloy coating containing 1–70% manganese and preferably 1–30% manganese and 99–70% aluminum together with any incidental impurities. The base material to be coated may be metals such as ferrous metal and the molten metal may be sprayed in accordance with U.S. Patents 2,490,543 and 2,845,366.

The aluminum-manganese alloy coatings of the present invention also may be deposited by decomposition or reduction of volatile compounds of the respective metals. For instance, a mixture of heat-decomposable compounds of aluminum and manganese may be formed and the mixture subjected to a temperature at which the compounds decompose to form metallic aluminum and manganese which is deposited on the base material to form an alloy coating thereon. Alternatively, a mixture of compounds of aluminum and manganese which are reducible to metallic aluminum and manganese may be formed, and the mixture reduced to produce metallic aluminum and manganese which is deposited on the base material. The resultant alloy coatings may contain 1–70% manganese and preferably 1–30% manganese and 99–70% aluminum together with incidental impurities. Numerous publications and patents disclose suitable decomposable or reducible manganese and aluminum compounds, including U.S. Patents 2,772,985, 2,880,115, 2,886,469, 2,898,235, and 2,921,868 and the general procedures disclosed in these patents may be followed, modified as mentioned above in order to produce an aluminum-manganese coating of the desired composition.

Surprisingly, the alloy coatings of the present invention exhibit vastly improved corrosion resistance over pure aluminum coatings. Also, the alloy may be present in extremely thin coatings and yet excellent corrosion resistance is obtained. The coating thickness does not adversely affect the brightness and both light and heavy coatings are surprisingly ductile. For example, bright deposits have been obtained at coating thicknesses of 15-millionths of an inch and lower to 500-millionths of an inch and higher. The alloy coatings of the present invention also exhibit superior adhesion properties and the porosity of the coatings as determined by the ferri-cyanide porosity test is extremely low in even very thin coatings. In a conventional salt spray test, the improved corrosion resistance of aluminum-manganese alloy coatings is illustrated by the fact that 15-millionths of an inch of aluminum-manganese alloy (80% Al–20% Mn) is equivalent in resistance to red rust formation of 0.1 ounce/square foot of zinc, 7-millionths of an inch of the above alloy is equivalent to 0.25 pound per base box of tin in resistance to red rust formation and corrosion tests on equal thicknesses of the alloy coating and pure aluminum coating show that the alloy coating is markedly superior to aluminium. There also is a difference in the nature of the type of protection obtained when electroplating an aluminum-manganese alloy rather than aluminum alone. For example, the matte aluminum coatings of the prior art have been found to act as sacrificial coatings in the manner of zinc, while aluminum-manganese alloy coatings have been found to act as barrier coatings in the manner of tin. This is a further unusual and unexpected result of the present invention which is believed to be at least partially responsible for the markedly improved corrosion resistance.

The term "alloy" is broadly used herein when referring to the aluminum-manganese coatings of the invention. The term "alloy" is defined in The International Dictionary of Physics and Electronics, published by D. Van Nostrand Company, Inc., New York, New York, 1956, as follows:

"Generally speaking, a macroscopically homogeneous mixture of metals. This definition covers an immense class of materials of great technological importance. There are various types of alloys. Thus, the atoms of one metal may be able to replace the atoms of the other on its lattice sites, forming a substitutional alloy, or solid solution. If the sizes of the atoms, and their preferred structures, are similar, such a system may form a continuous series of solutions—otherwise the miscibility may be limited. Solid solutions, at certain definite atomic proportions, are capable of undergoing an order-disorder transition into a state where the atoms of one metal are not distributed at random through the lattice sites of the other, but form a superlattice. Again, in certain alloy systems, intermetallic compounds may occur, with certain highly complicated lattice structures, forming distinct crystal phases. It is also possible for light, small atoms to fit into the interstitial positions in a lattice of a heavy metal, forming an interstitial compound."

The foregoing detailed description and the following specific examples are for purposes of illustration only and are not to be taken as limiting to the spirit or scope of the appended claims.

EXAMPLE I

Ferrous metal strip wet-pretreated following the procedure set out in column 4, line 64—column 5, line 6, of the specification and having a temperature of about 325° F. is passed at a speed of ten feet per minute through plating apparatus similar to that illustrated in FIGURES 1 and 2 of the drawings. A feed of 72 cu. ft./hr. of dry gaseous nitrogen is passed into the space between the hood and the electrolyte level and also into the strip conditioning unit for the purpose of preventing water contamination of the electrolyte due to the entrance of atmospheric moisture. The ferrous metal strip is dry after the pretreatment and completely free of "free" water, combined water such as hydrated metal salts and substances reacting under conditions present in the electroplating zone to form water and is maintained in this condition at the time of entering the electroplating zone.

The strip is introduced into a fused fuming electrolyte containing by weight eighty parts aluminum chloride, ten parts sodium chloride and ten parts potassium chloride which is maintained at a temperature of 325° F. Aluminum-manganese alloy anodes (80% by weight aluminum and 20% by weight manganese) ten feet in length are used employing a current density of 42.5 amps/sq. ft. to electroplate a coating thirty millionths of an inch thick of bright aluminum-manganese alloy thereon. After plating, the strip is fed from the electrolyte through the outlet zone and is washed in water and dried. The aluminum-manganese alloy plate has a bright, lustrous and reflective surface which is highly pleasing to the eye and which does not require a brightening treatment of any nature. Upon analysis, the alloy coating contains about 80% aluminum and 20% manganese. The coating is adherent, dense, and exhibits a lower porosity and higher corrosion resistance than aluminum electroplate having a coating of equal thickness. Also, the coating is surprisingly ductile as evidenced by Erickson Cup Tests. The electroplate may be formed into containers and the like in a manner analogous to that of tinplate.

Following the above procedure, current densities up to 100 amps/sq. ft. are satisfactory and produce good electroplate. Also, electroplate having an aluminum-manganese alloy coating thereon of from fifteen-millionths to five hundred-millionths of an inch in thickness may be produced without impariment to the appearance of the coating.

EXAMPE II

Panels were prepared from can making quality blackplate and then subjected to the following wet laboratory scale pretreatment:

(1) 15 second cathodic treatment at 100 amps/sq. ft. in a hot 2 oz./gal. Orthosil solution;
(2) Cold water (70° F.) spray rinse;
(3) Anodic pickle in cold 17 wt. percent sulfuric acid at 100 amps/sq. ft. for 2 seconds;
(4) Cold water (70° F.) spray rinse;
(5) Hot water rinse (180° F.);
(6) Roll dry with rubber rolls; and
(7) 10 second immersion in fused plating salts before electroplating with the aluminum-manganese alloy coating to bring the panel to about the bath temperature.

A fused salt electroplating bath was prepared from 80 parts aluminum chloride, 10 parts sodium chloride and 10 parts potassium chloride (by weight), and then anhydrous manganese chloride added thereto in varying amounts as necessary to give the percentages of manganese in the bath noted below in Table I. The bath was maintained at a temperature of about 325° F. Anodes of aluminum (28–F aluminum) were immersed in the electrolyte and an anode-cathode spacing of about 1½" was used. The plating conditions and manganese concentration were varied over wider ranges in electroplating panels with the aluminum-manganese alloy. The plating conditions used, data obtained, and observations appear below in Table I.

Table I

| Panel No. | Amps. | Sec. | Coulombs | Brightness | C.D. (a.s.f.) | Percent Mn in Bath | Percent Mn in Coating |
|---|---|---|---|---|---|---|---|
| 1 | 20 | 40 | 800 | Matte-White | 79 | 0 | 0 |
| 2 | 10 | 80 | 800 | do | 40 | 0 | 0 |
| 3 | 20 | 100 | 2,000 | do | 79 | 0 | 0 |
| 4 | 20 | 200 | 4,000 | do | 79 | 0 | 0 |
| 5 | 16 | 60 | 960 | do | 56 | 0 | 0 |
| 6 | 16 | 120 | 1,920 | do | 56 | 0 | 0 |
| 7 | 5 | 120 | 700 | Darkened-Matte | 18 | 0.11 | 0.41 |
| 8 | 16 | 60 | 960 | do | 56 | 0.11 | 0 |
| 9 | 24 | 45 | 1,080 | do | 85 | 0.11 | |
| 10 | 14 | 60 | 840 | do | 55 | 0.11 | |
| 11 | 5 | 140 | 700 | do | 19 | 0.11 | |
| 12 | 5 | 120 | 700 | Edges Bright Only | 19 | 0.21 | 1.15 |
| 13 | 15 | 50 | 750 | do | 59 | 0.21 | 3.4 |
| 14 | 25 | 35 | 875 | do | 98 | 0.21 | |
| 15 | 5 | 150 | 750 | Fairly Bright All Over But Some Dull Streaks. | 19 | 0.32 | |
| 16 | 15 | 50 | 750 | do | 59 | 0.32 | |
| 17 | 24 | 35 | 840 | do | 94 | 0.32 | |
| 18 | 20 | 45 | 900 | do | 78 | 0.32 | |
| 19 | 10 | 90 | 900 | do | 39 | 0.32 | 7.3 |
| 20 | 15 | 60 | 900 | Fairly Bright All Over and Much Improved in Appearance; few Dull Streaks. | 60 | 0.41 | 16.2 |
| 21 | 8 | 120 | 960 | do | 32 | 0.41 | |
| 22 | 6 | 120 | 720 | do | 24 | 0.41 | 10.1 |
| 23 | 5 | 200 | 1,000 | do | 20 | 0.41 | |
| 24 | 10 | 70 | 700 | do | 40 | 0.41 | |
| 25 | 20 | 35 | 700 | do | 80 | 0.41 | |
| 26 | 10 | 60 | 600 | Bright | 40 | 0.53 | |
| 27 | 5 | 120 | 600 | do | 20 | 0.53 | |
| 28 | 25 | 35 | 900 | do | 100 | 0.53 | |
| 29 | 15 | 50 | 750 | do | 60 | 0.53 | |
| 30 | 20 | 40 | 800 | do | 80 | 0.53 | 14.2 |
| 31 | 10 | 320 | 3,200 | do | 40 | 0.53 | |
| 32 | 15 | 200 | 3,000 | do | 60 | 0.53 | 16.2 |
| 33 | 5 | 60 | 300 | do | 20 | 0.53 | |
| 34 | 5 | 120 | 600 | do | 20 | 0.53 | |
| 35 | 5 | 420 | 2,100 | do | 20 | 0.53 | 15.6 |
| 36 | 15 | 90 | 1,350 | do | 60 | 0.53 | |
| 37 | 10 | 70 | 700 | do | 34 | 0.59 | |
| 38 | 15 | 50 | 750 | do | 52 | 0.59 | |
| 39 | 12 | 250 | 3,000 | do | 41 | 0.59 | |
| 40 | 10 | 70 | 700 | do | 34 | 0.59 | |
| 41 | 15 | 150 | 2,250 | do | 52 | 0.59 | |
| 42 | 5 | 150 | 750 | do | 18 | 0.59 | |
| 43 | 10 | 240 | 2,400 | do | 34 | 0.59 | |
| 44 | 20 | 35 | 700 | do | 68 | 0.59 | |
| 45 | 10 | 70 | 700 | do | 34 | 0.66 | |
| 46 | 5 | 140 | 700 | do | 18 | 0.66 | |
| 47 | 20 | 45 | 900 | do | 68 | 0.66 | |
| 48 | 15 | 50 | 750 | do | 52 | 0.66 | |
| 49 | 10 | 360 | 3,600 | do | 34 | 0.66 | |
| 50 | 16 | 200 | 3,200 | do | 55 | 0.66 | 21.7 |
| 51 | 10 | 360 | 3,600 | do | 34 | 0.66 | |
| 52 | 8 | 30 | 240 | do | 27 | 0.66 | |
| 53 | 14 | 60 | 840 | do | 48 | 0.79 | |
| 54 | 10 | 90 | 900 | do | 34 | 0.79 | 26.5 |
| 55 | 5 | 140 | 700 | do | 18 | 0.79 | |
| 56 | 10 | 300 | 3,000 | do | 34 | 0.79 | |
| 57 | 10 | 300 | 3,000 | do | 34 | 0.79 | |
| 58 | 24 | 30 | 720 | do | 83 | 0.79 | 16.4 |
| 59 | 15 | 60 | 900 | do | 52 | 0.79 | |
| 60 | 10 | 15 | 150 | do | 34 | 0.79 | |
| 61 | 12 | 85 | 1,000 | do | 40 | 0.88 | |
| 62 | 5 | 120 | 600 | do | 17 | 0.88 | |
| 63 | 15 | 50 | 750 | do | 50 | 0.88 | |
| 64 | 22 | 35 | 770 | do | 72 | 0.88 | 16.3 |
| 65 | 20 | 180 | 3,600 | do | 60 | 0.88 | |
| 66 | 10 | 180 | 1,800 | do | 33 | 0.88 | 21.6 |
| 67 | 10 | 30 | 300 | do | 33 | 0.88 | 24.1 |
| 68 | 10 | 15 | 150 | do | 33 | 0.88 | |

Panels 9, 13, 23, 26, 28, 48, 53, 59, 61, 62, 64 and 67 were given standard "Scotch" tape adhesion tests. Panels 9 and 13 exhibited good adhesion, panel 23 very good adhesion and 26, 28, 48, 53, 59, 61, 62, 64 and 67 excellent adhesion.

EXAMPLE III

A series of steel panels coated with electrodeposits of zinc, tin, aluminum and an alloy of aluminum and manganese were subjected to a salt spray corrosion test in a cabinet maintained at 95° F. using a 5% sodium chloride solution. The deposits of zinc and tin were used in this test for control purposes. The aluminum-manganese alloy coatings were produced in accordance with the Example II procedure.

The panels subjected to the salt spray test were as follows:

Table II

| Sample | Description |
|---|---|
| A | 0.10 oz./ft.² of electrodeposited zinc. |
| B | Do. |
| C | 89-millionths of an inch matte aluminum coating. |
| D | Do. |
| E | 80-millionths of an inch bright aluminum alloy coating. |
| F | Do. |
| G | Do. |
| H | Do. |
| I | Do. |
| J | Do. |
| K | Do. |
| L | Do. |
| M | 60-millionths of an inch bright aluminum alloy coating. |
| N | 15-millionths of an inch bright aluminum alloy coating. |
| O | 30-millionths of an inch bright aluminum alloy coating. |
| P | 7-millionths of an inch bright aluminum alloy coating. |
| Q | 0.25 lb./BB reflowed tinplate N.C.T. |

Observations made during the test included:

(1) Time required for white rust or stain to form
(2) Type of coating protection (a) sacrificial or (b) barrier
(3) Time required for the first sign of red rust to appear on the panel
(4) Time required to produce stages of coverage by red rust The attack on the samples varied according to the type of protection given by the respective coating. The data collected appears in Table III.

Table III

ANALYSIS OF SALT SPRAY TEST DATA

| Sample No. | Type of Coating | Coating Thickness in Millionths of an Inch | Hours to First Sign of— | | Hours to First Red Rust | Hours to 5% Red Rust | Hours of 10% Red Rust | Over 50% Red Rust | Remarks |
|---|---|---|---|---|---|---|---|---|---|
| | | | White Rust | Stain | | | | | |
| Q | Sn | 15 | | | | | | 2 | Barrier Coating. |
| A | Zn | 85 | 1 | | | | 12 | 19 | Sacrificial Protection. |
| B | Zn | 85 | 1 | | | | 12 | 19 | Do. |
| P | Al-Mn | 7 | | | 5 | 7 | 12 | 19 | Barrier Coating. |
| N | Al-Mn | 15 | | 7 | 19 | | 36 | 42 | Do. |
| D | Al | 80 | | | 19 | | | 36 | Sacrificial Coating. |
| C | Al | 80 | | 7 | 36 | 42 | 49 | 72 | Do. |
| O | Al-Mn | 30 | | 12 | 42 | | 95 | 145 | Barrier Coating. |
| E | Al-Mn | 80 | | 42 | 72 | 145 | 186 | (1) | Do. |
| M | Al-Mn | 60 | | 49 | 145 | 145 | 186 | (1) | Do. |
| F | Al-Mn | 80 | | 49 | 72 | 145 | 186 | (1) | Do. |
| I | Al-Mn | 80 | | | 126 | 186 | (1) | | Do. |
| K | Al-Mn | 80 | | 42 | 72 | (1) | | | Do. |
| H | Al-Mn | 80 | | 42 | 95 | (1) | | | Do. |
| J | Al-Mn | 80 | | | 145 | (1) | | | Do. |
| L | Al-Mn | 80 | | 42 | (1) | | | | Do. |
| G | Al-Mn | 80 | | 72 | (1) | | | | Do. |

[1] Not Reached, Test Concld.

The results of the salt spray test on bright aluminum manganese alloy deposits indicate a remarkable corrosion resistance. For example, when compared to an equivalent thickness of zinc, the alloy failed to show red rust for 72 hours, whereas, a similar thickness of zinc showed red rust in 12 hours. The 85-millionths of an inch electrodeposited zinc coatings have the second disadvantage of forming white rust within the first hour in the test.

For 0.25 lb./BB tin (15-millionths of an inch thickness), red rust appears in less than 2 hours, whereas, for the 0.05 lb./BB alloy coating (7-millionths of an inch thickness) red rust occurs at 7 hours. An equivalent thickness of the alloy (15-millionths of an inch) showed no red rust until it was in the salt spray for 19 hours.

It was determined in the salt spray test that the electrodeposits of tin and the alloy of aluminum and manganese act as barrier coatings and the electrodeposits of zinc and aluminum are sacrificial. The superior performance and barrier protection given by the alloy coating indicate an extremely low porosity. Bright deposits of approximately 80% aluminum and 20% manganese gave superior protection against red rust formation in the salt spray to all other coatings tested.

The following discussion lists various observations noted for each class of coating:

Tin coatings.—The 0.25 lb./BB tin deposits protected the steel by acting as a barrier coating. The first red rust formed at the pores and rapidly spread over the panel. Only 2 hours were required to cover the panel with approximately 50% red rust.

Zinc coatings.—The electrodeposited zinc coatings of 0.10 oz./ft.² (85-millionths of an inch thickness) were covered with white rust at the first hour check. There was no red rust until substantial areas of the base metal were exposed, which was first found at the 12 hour check. Once the red rusting had started, it increased very rapidly and at the 10 hour check 50% of the panel was covered by red rust.

Matte aluminum coatings.—The matte aluminum coatings of 80-millionths of an inch thickness acted as a sacrificial coating the same as the zinc. However, the first effects of the test were observed as a graying of the coating. Then the coating began to dissolve at the top section of the sample where it was most affected by the salt spray. This action exposed large areas of the base metal and red rust began to form. As the coating was removed progressively down the panel, the red rust followed the removal pattern. The aluminum deposits gave better protection than the zinc since there was no red rust found on the panels coated with aluminum until the 19 hour check. Fifty percent red rust was found at the 36 hour check.

Bright alloy deposits of aluminum and manganese.—The first effect of the salt spray test on the allow coating was to produce a blue or light tan stain. This stain was usually found as fine streaks and was generally an indication as to where the first red rust would form. The thinner the coating, the sooner this stain formed. For example, the 15-millionths of an inch coating stained in 7 hours, the 30-millionths of an inch coating stained in 12 hours and all coatings over 60-millionths of an inch stained sometime between 42 and 72 hours.

The formation of red rust was also a function of coating weight up to the 60-millionths of an inch coating. The 7-millionths of an inch coating showed rust in 5 hours; the 15-millionths of an inch showed rust in 19 hours and the 30-millionths of an inch showed red rust in 42 hours. All coatings of 60- and 80-millionths of an inch varied between rust at 72 hours and no rust at 136 hours at which time the test was concluded. None of the panels plated with coatings over 60-millionths of an inch had 50% of their areas covered by red rust at the conclusion of the test.

What is claimed is:

1. A base material coated on at least a portion of its surface with an alloy consisting essentially of about 10–70% manganese and the remainder aluminum together with incidental impurities, *the coating of the alloy being present in the form of an integral and continuous layer which is tightly adhered to the surface of the base material.*

2. A base material coated on at least a portion of its surface with an alloy of aluminum and manganese consisting essentially of about 16–30% manganese and the remainder aluminum together with incidental impurities, *the coating of the alloy being present in the form of an integral and continuous layer which is tightly adhered to the surface of the base material.*

3. A base material coated on at least a portion of its surface with an electrodeposited alloy of aluminum and manganese consisting essentially of about 10–70% manganese and the remainder aluminum together with incidental impurities.

4. A base material coated on at least a portion of its surface with an electrodeposited alloy of aluminum and manganese consisting essentially of about 16–30% manganese and about 84–70% aluminum together with incidental impurities, the alloy being bright as electrodeposited.

5. A ferrous metal base electroplated with an alloy consisting essentially of about 10–70% manganese and the remainder aluminum together with incidental impurities.

6. A ferrous metal base electroplated with an alloy consisting essentially of about 16–30% manganese and about 84–70% aluminum together with incidental impurities, the alloy being bright as electroplated.

7. A ferrous metal base coated on at least a portion of its surface with an alloy consisting essentially of about 10–70% manganse and the remainder aluminum together with incidental impurities, *the coating of the alloy being present in the form of an integral and continuous layer which is tightly adhered to the surface of the ferrous metal base whereby the ferrous metal base is protected from corrosion.*

8. A ferrous metal base coated on at least a portion of its surface with an alloy consisting essentially of about 16–30% manganese and the remainder aluminum together with incidental impurities, *the coating of the alloy being present in the form of an integral and continuous layer which is tightly adhered to the surface of the ferrous metal base whereby the ferrous metal base is protected from corrosion.*

References Cited

The following references, cited by the examiner, are of record in the patented file of this patent or the original patent.

UNITED STATES PATENTS

| | | | |
|---|---|---|---|
| 1,027,495 | 5/1912 | McNitt | 204—71 |
| 1,236,383 | 8/1917 | Fahrenwald | 117—130 |
| 1,256,084 | 2/1918 | Watkins | 117—130 |
| 1,426,507 | 8/1922 | Rodrian | 204—71 |
| 1,464,625 | 8/1923 | Pacy | 204—67 |
| 1,795,512 | 3/1931 | Schmidt | 204—39 |
| 1,830,142 | 11/1931 | Taylor | 75—138 |
| 1,974,970 | 9/1934 | Nock | 75—1 |
| 2,013,926 | 9/1935 | Pacy | 75—58 |
| 2,149,656 | 3/1939 | Armstrong | 250—25.7 |
| 2,296,866 | 9/1942 | Moss | 75—138 X |
| 2,460,537 | 2/1949 | Rollason | 117—207 |
| 2,745,172 | 5/1956 | Townsend | 29—194 |
| 2,762,764 | 9/1956 | Owen | 204—28 |
| 2,807,575 | 9/1957 | Charlton | 204—39 |
| 3,018,194 | 1/1962 | Norman et al. | 117—107.2 |

FOREIGN PATENTS 568,903 12/1960 Belgium.

OTHER REFERENCES

"Constitution of Binary Alloys" by Dr. Max Hansen, published 1958, McGraw-Hill Book Co., pages 110–113.

"Gittings et al.: Article in Trans. ASM, Vol. 43 (1951), pages 587–610.

HYLAND BIZOT, *Primary Examiner.*